(12) United States Patent
Eschenburg

(10) Patent No.: US 9,217,657 B2
(45) Date of Patent: Dec. 22, 2015

(54) DISPENSING

(76) Inventor: Jerry E. Eschenburg, East China, MI (US)

( * ) Notice: Subject to any disclaimer, the term of this patent is extended or adjusted under 35 U.S.C. 154(b) by 1720 days.

(21) Appl. No.: 12/387,764

(22) Filed: May 7, 2009

(65) Prior Publication Data

US 2009/0283551 A1    Nov. 19, 2009

Related U.S. Application Data

(60) Provisional application No. 61/127,102, filed on May 9, 2008.

(51) Int. Cl.
| | | |
|---|---|---|
| G01F 11/02 | (2006.01) | |
| B05B 11/02 | (2006.01) | |
| B05C 17/005 | (2006.01) | |
| B05C 17/01 | (2006.01) | |

(52) U.S. Cl.
CPC ............. *G01F 11/025* (2013.01); *B05B 11/02* (2013.01); *B05C 17/00576* (2013.01); *B05C 17/0109* (2013.01)

(58) Field of Classification Search
CPC ............... B05C 17/00576; B05C 17/0109; B05B 11/02; G01F 11/025
USPC .............. 222/391, 392, 340, 386, 405, 441
See application file for complete search history.

(56) References Cited

U.S. PATENT DOCUMENTS

| | | | | |
|---|---|---|---|---|
| 3,137,166 A | * | 6/1964 | Nichols | 474/207 |
| 4,592,245 A | * | 6/1986 | Pickles | 74/89.21 |
| 4,793,526 A | * | 12/1988 | Webb | 222/391 |
| 4,874,117 A | * | 10/1989 | Kay et al. | 222/487 |

* cited by examiner

*Primary Examiner* — Jason Boeckmann
(74) *Attorney, Agent, or Firm* — Christopher John Rudy

(57) ABSTRACT

Device for dispensing embraces a walled, hollow housing having an inside wall surface and having an opening on a first end; a piston that sealingly engages the inside wall surface, beginning at a position away from the first end; and an actuating connection to the piston internal the housing. A material for dispensing can be supplied to the inside of the hollow housing, and dispensed through the opening by actuation and movement of the piston.

20 Claims, 2 Drawing Sheets

DISPENSING

This claims the benefits under 35 USC 119(e) of provisional application No. 61/127,102 filed on May 9, 2008 A.D. Its entire specification with drawings is incorporated herein by reference.

FIELD AND PURVIEW OF THE INVENTION

This concerns a device and method for dispensing, which, in general, employs a walled, hollow housing with an opening on an end and a piston that sealingly engages the inside wall surface beginning on an end of the housing away from the end with the opening. The piston is actuated by a connection to the piston internal the housing. A material for dispensing can be supplied to the inside of the hollow housing, and dispensed through the opening by actuation and movement of the piston. Nearly all, if not all, of the contents inside the housing can be dispensed.

BACKGROUND TO THE INVENTION

A vexing problem with many dispensed consumer goods such as pump bottles of hand lotion or ketchup is waste of the product. Not infrequently, a certain portion of product remains in the bottle, unable to be dispensed and there to be wasted.

It would be desirable to ameliorate if not overcome this. It would be desirable to provide alternative(s) to the art.

A FULL DISCLOSURE OF THE INVENTION

In general, provided is a device for dispensing, which comprises a walled, hollow housing having an inside wall surface and having an opening on a first end; a piston that sealingly engages the inside wall surface, beginning at a position away from the first end; and an actuating connection to the piston internal the housing. A material for dispensing can be supplied to the inside of the hollow housing, and dispensed through the opening by actuation and movement of the piston.

The invention is useful in dispensing.

Significantly, by the invention, the art is advanced in kind. The problem of waste found with many pump bottle systems can be ameliorated if not overcome. An alternative is provided the art. By the practice of the invention, nearly all, if not all, of the contents inside the housing can be dispensed. The dispensing can be done readily and neatly. The invention can be cost efficient, for instance, as cheap or cheaper than a pump dispensing system, and consumers may see its value to make a choice of it over a similar product dispensed by a pump bottle dispensing system.

Numerous further advantages attend the invention.

The drawings form part of the specification hereof. With respect to the drawings, which are not necessarily drawn to scale, the following is briefly noted:

Figure 1:
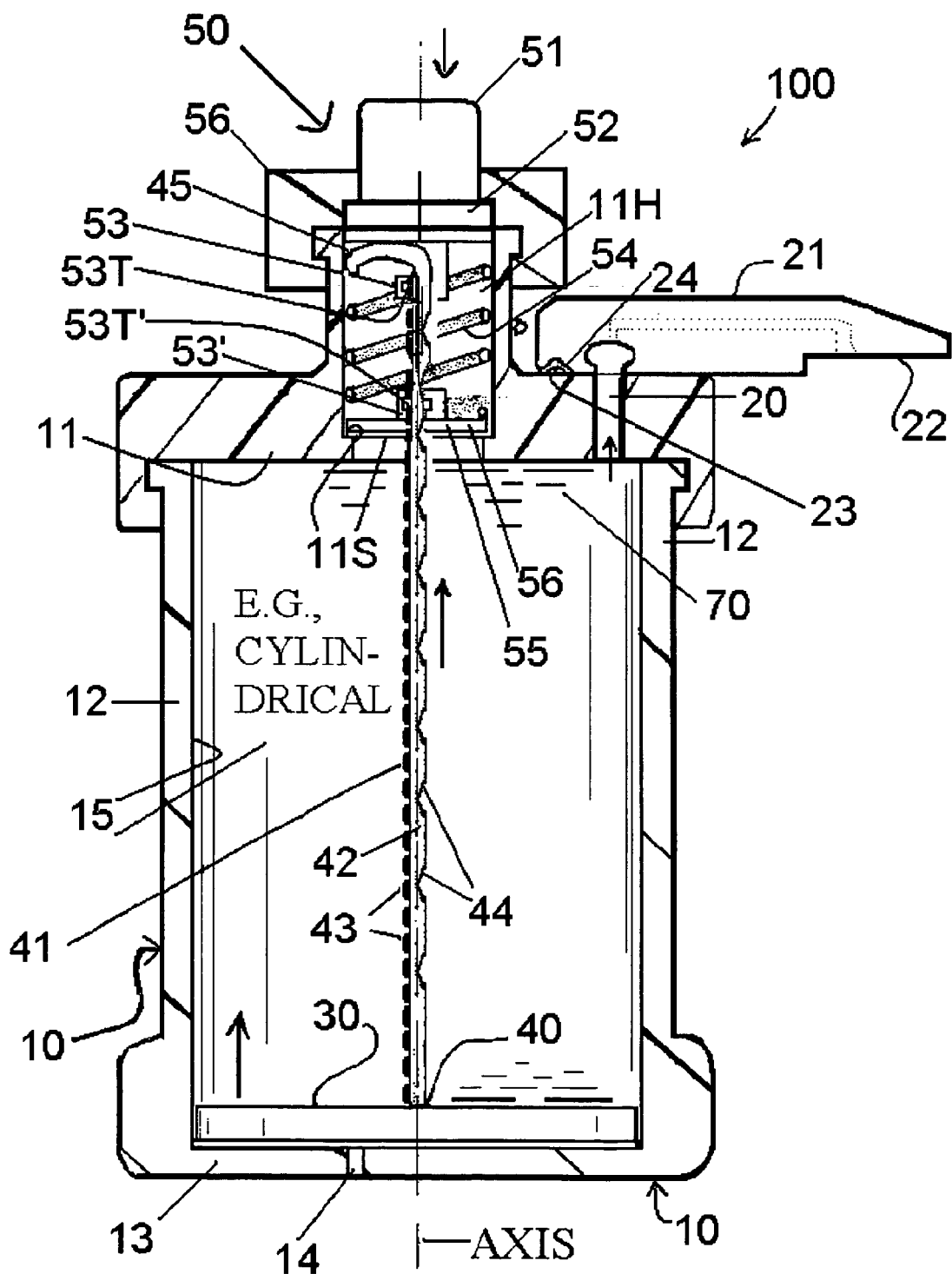
FIG. 1 is a side plan view of a device for dispensing. The device employs a flexible plastic gear rack and ratchet head.

The invention can be further understood by the detail set out below, which may be read in view of the drawings. Such detailed disclosure, as with the disclosure set forth above, is to be taken in an illustrative and not necessarily limiting sense.

The present dispensing device includes a walled, hollow housing. The housing has an inside wall surface and an opening on a first end. The opening can be a simple hole or a more highly engineered member such as a spout or nozzle, which can vary in configuration depending on the material to be dispensed and other factors. A piston sealingly engages the inside wall surface, beginning at a position away from the first end. The housing can be of any suitable shape for its outside and inside wall surfaces, for example, a cylinder, an ellipse, an oval, a smooth C-shape, a triangle, a square, a rectangle, a pentagonal, even a V-shape, an H-shape, a star-shape, or other polygonal and/or curvilinear shape. Generally, although not necessarily always, the inside wall surface retains its shape along a linear axis. It is important that the piston sealingly engage the inside wall surface along its path of traverse. Thus, for example, the inner wall shape may embrace a quarter, i.e., ninety degrees, of a truncated cylinder, and have the piston hinged along what would have been the central axis of the full cylinder and form a movable flap that can move from a second flat wall along the arc of the quarter cylinder until it reaches a first flat wall, which has the opening through which material can be dispensed with the movement of the flap type piston, all the while during its traverse, as it were, from a 12-o'clock to a 3-o'clock position, also engaging the inner surfaces of the "top" and "bottom" of the quarter cylinder. Two or more inner compartments with corresponding pistons can be provided in one housing to dispense two or more separate materials apart from one another or for mixing together with dispensing. An actuating connection to the piston is provided internal the housing. The actuating connection may embrace a flexible contrivance such as a belt, string or chain, or a rigid contrivance such as a rod, which is connected to the piston, with, say, one such contrivance connected about the center of the piston, or several of such contrivances connected at several points on the piston surface. With its internal actuating connection, the piston is "pulled," not "pushed," through its course of travel. Among other benefits of this pulling on the connection inside the piston for actuation are that the dispensing device can "get it all" or, if not, nearly all, of the material to be dispensed; it can do this neatly; and it can do this without need for auxiliary equipment such as the case in known caulk tubes, which require a caulk gun. A pump, too, is avoided. The inefficient and oftimes messy squeezing or crushing of side walls such as with toothpaste tubes can be avoided as well.

Any suitable material may be employed to make the component parts of the device. Material(s) such as wood, metal, ceramic, glass and/or plastic may be employed.

A material for dispensing can be supplied to the inside of the hollow housing, and dispensed through the opening by actuation and movement of the piston. The selection of the material(s) for dispensing can be quite vast. The material may be a solid such as a graphite lubricant; a liquid, which may be highly viscous such as a caulk or a heavy grease, be of an intermediate viscosity such as a light grease, toothpaste, hair gel, shampoo, hand lotion or cream, glue or glue components such as epoxy glue and its hardener, medical ointment, or liquid food, e.g., ketchup, mustard, mayonnaise, or be of a lower viscosity such as a motor or cooking oil, a liquid medicine, e.g., cough syrup, or a syrup such as pancake syrup or molasses; a liquid emulsion not previously mentioned (such as the hand lotion or cream and foods) such as, in generally, a solid in liquid emulsion, a liquid in liquid emulsion, or a gas in liquid emulsion; a gas and/or a solid or liquid in gas emulsion.

With more particular reference to the drawings, dispensing device 100 includes hollow housing 10, opening 20, piston 30, and actuating connection 40. Actuation of the connection 40 can be by plunger 50 or gear 60. Material 70 can be dispensed.

The hollow housing 10 has top wall 11; side walls 12; optional bottom wall 13, which may have vacuum-releasing opening 14; and piston-engaging inside wall surface 15. The side walls 12 are imperforate along the piston-engaging surface 15.

The opening 20 opens through the top wall 11. The opening 20 may embrace spout 21, which may have dispensing opening 22 and on-off stop engagement button 23 and cup 24 to position the same. The opening 20 may culminate in an aerosol spray head, especially for less viscous material for dispensing.

The piston 30 sealingly engages the inside wall surface 15 along its course of travel, beginning somewhere away from and moving toward the top wall 11. It has piston body 31 and sealing edge 35, which sealingly engages the inside wall surface 15.

The actuating connection 40 is made to the piston 30 internal the housing 10. The actuating connection 40 is made also to a distal end of a flexible contrivance, for example, flexible gear rack 41, which may be commercially obtained in a form of a flexible plastic tie such as a Zip-Tie, which has flexible belt body 42 and teeth 43. Weak spots 44 may be provided along the length of the flexible belt body 42 so that spent portion 45 of the flexible gear rack 41 can fold up after the flexible gear rack 41 has been pulled to actuate the piston 30. Actuation of the actuating connection 40 can be accomplished in various ways.

For example, pulling of the flexible gear rack 41 can be accomplished through activation of the plunger 50 (FIG. 1). The plunger 50 may embrace a spring-return along with a ratchet head, which can reside in hollow top housing 11H, and can include push button 51, which is pushed down by a thumb or finger, and which is in contact with upper washer 52 so that when the push button 51 is pushed down the upper washer 52 moves down as well. Attached to or part of the upper washer 52 is upper ratchet head 53, which has an orifice through which the flexible gear rack 41 can pass in one side and out another. As, for example, with the securing end of a Zip-Tie plastic tie, inside the orifice of the upper ratchet head 53 is attached tongue 53T; the free end of the tongue 53T is disposed upwardly to slip by the teeth 43 of the flexible gear rack 41 when the push button is pushed down but engage the teeth 43 of the flexible gear rack 41 when the upper washer 52 and upper ratchet head 53 experience pushing up from spring 54 so as to permit the upper washer 52 and upper ratchet head 53 to move the flexible gear rack 41 and hence the piston 30 upward. The spring 54 is in contact with a lower surface of the upper washer 52, and is driven downward into compression when the push button 51 is pushed down. Compression of the spring 54 results because its lower end is in contact with an upper surface of lower washer 55, which resists the downward force of the pushing by having rim 56 that rests on shoulder 11S in the hollow housing 11H. Attached to or part of the lower washer 55 is lower ratchet head 53', which, like the upper ratchet head 53, has an orifice through which the flexible gear rack 41 can pass in one side and out another. As again with the securing end of a Zip-Tie plastic tie, inside the orifice of the lower ratchet head 53' is attached tongue 53T'; the free end of the tongue 53T' is disposed upwardly to engage the teeth 43 of the flexible gear rack 41 so that the flexible gear rack 41 does not move downward. Thus, the piston 30 is prevented from moving downward. When compression of the spring 54 is released, the spring 54 extends upward, pushes the upper washer 52 and upper ratchet head 53 upward, and, owing to the grip on the flexible gear rack 41 provided by the tongue 53T attached inside the orifice of the upper ratchet head 53 on a tooth 43 of the flexible gear rack 41, and the slippage of the flexible gear rack 41 when it moves upward through the lower washer 55 and lower ratchet head 53' and past the tongue 53T', the flexible gear rack 41 moves up with the force of the spring 54 and draws the piston 30 connected by the actuating connection 40 upward. The strength of the spring 54 may vary depending on the size of the opening 20, the nature of the material 70, and so forth. Cap 56 may be present.

Figure 2:
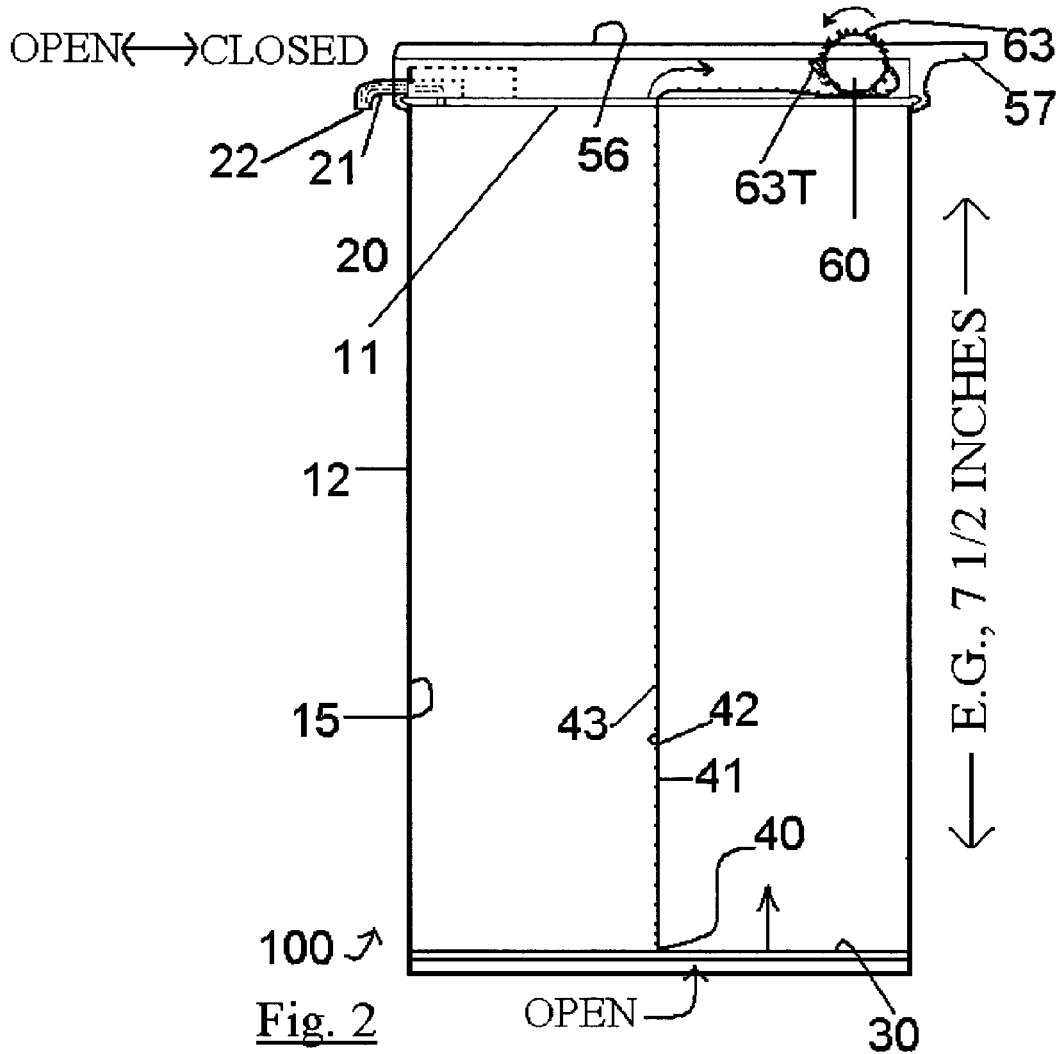
FIG. 2 is a side plan view of a device for dispensing. The device employs a flexible plastic gear rack and planetary gear.
Figure 3:
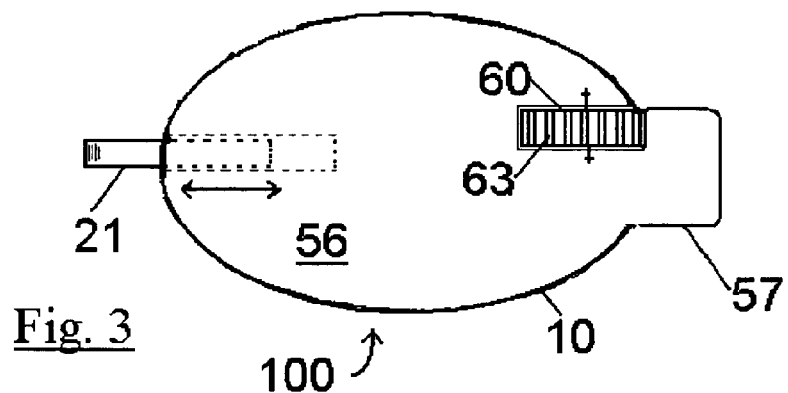
FIG. 3 is a top view of the device of FIG. 2.

As another example, pulling of the flexible gear rack 41 can be accomplished through activation of the gear 60, which may be a manually spinnable, clip-in planetary gear (FIGS. 2 and 3). The gear 60 has teeth 63 and is rotated to engage the teeth 43 of the flexible gear rack 41. Thus, the piston 30 is pulled up. Anti-reverse rotation device such as tongue 63T may be provided to keep the piston 30 from falling down. Handle 57 may be present, say, for holding by the fingers.

The material 70 for dispensing, say, which embraces a liquid or liquid emulsion, can be supplied inside the hollow housing 10, confined by the top wall 11, inside wall surface 15, and piston 30. The material 70 is dispensed through the opening 20 by actuation of the piston 30 with the actuating connection 40.

The present invention is thus provided. Various feature(s), part(s), step(s), subcombination(s) and/or combination(s) can be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. A device for dispensing, which comprises a walled, hollow housing having an inside wall surface and having an opening on a first end; a piston, which sealingly engages the inside wall surface along its path of traverse, beginning at a position away from the first end, and which is "pulled," not "pushed," through its course of travel; and an actuating connection to the piston internal the housing—such that a material for dispensing can be supplied to the inside of the hollow housing above the piston, and dispensed through the opening by actuation and movement of the piston, wherein:
   the actuating connection includes a flexible gear rack of one and only one integral piece of a flexible member having teeth for engagement with a protruding member that engages a tooth of the flexible gear rack; and
   the protruding member is present.

2. The device of claim 1, wherein the inside wall surface retains its shape along a linear axis.

3. The device of claim 1, wherein the opening on a first end includes a spout or nozzle.

4. The device of claim 2, wherein the opening on a first end includes a spout or nozzle.

5. The device of claim 1, wherein:
   the walled, hollow housing has a top wall, side walls, and a bottom wall, optionally having a vacuum-releasing opening therein;
   the opening on a first end opens through the top wall;
   the actuating connection is made also to a distal end of the flexible member; and
   actuation of the actuating connection is by plunger or gear.

6. The device of claim 5, wherein the flexible member includes a flexible belt body, and weak spots are provided along the length of the flexible belt body so that a spent portion of the flexible belt body can fold up after the flexible belt body has been pulled to actuate the piston.

7. The device of claim 5, wherein the plunger is present, and actuation of the actuating connection can be accomplished through activation of the plunger.

8. The device of claim 6, wherein the plunger is present, and actuation of the actuating connection can be accomplished through activation of the plunger.

9. The device of claim 1, wherein pulling of the flexible gear rack can be accomplished through activation of a manually spinnable, clip-in planetary gear, which has teeth and is rotated to engage teeth of the flexible gear rack so that the piston can be pulled up.

10. The device of claim 9, wherein an anti-reverse rotation device is provided to keep the piston from falling down.

11. The device of claim 10, wherein the anti-reverse rotation device includes a tongue.

12. The device of claim 6, wherein pulling of the flexible gear rack can be accomplished through activation of a manually spinnable, clip-in planetary gear, which has teeth and is rotated to engage teeth of the flexible gear rack so that the piston can be pulled up.

13. The device of claim 12, wherein an anti-reverse rotation device is provided to keep the piston from falling down.

14. The device of claim 13, wherein the anti-reverse rotation device includes a tongue.

15. A method for dispensing a material, which comprises:
providing a device embracing a walled, hollow housing having an inside wall surface and having an opening on a first end; a piston, which sealingly engages the inside wall surface along its path of traverse, beginning at a position away from the first end, and which is "pulled," not "pushed," through its course of travel; and an actuating connection to the piston internal the housing—wherein:
the actuating connection includes a flexible gear rack of one and only one integral piece of a flexible member having teeth for engagement with a protruding member that engages a tooth of the flexible gear rack; and the protruding member is present;
supplying the material to inside of the hollow housing and above said piston; and
actuating the actuating connection such that the material is dispensed through the opening by actuation and movement of the piston.

16. The method of claim 15, wherein the material includes a liquid.

17. A device for dispensing, which comprises a walled, hollow housing having an inside wall surface and having an opening on a first end; a piston, which sealingly engages the inside wall surface along its path of traverse, beginning at a position away from the first end, and which is "pulled," not "pushed," through its course of travel; and an actuating connection of a flexible contrivance, which embraces a flexible gear rack, and which is attached by a distal end whereof to the piston internal the housing—such that a material for dispensing can be supplied to the inside of the hollow housing and above the piston, and dispensed through the opening by actuation and movement of the piston, wherein:
actuation of the actuating connection is through activation of a plunger, which embraces a spring-return having a spring along with a ratchet head, which reside in a hollow top housing; and includes a push button, which can be pushed down by a thumb or finger, and which is in contact with an upper washer so that when the push button is pushed down the upper washer moves down as well;
attached to or part of the upper washer is upper ratchet head, which has an orifice through which the flexible gear rack can pass in one side and out another; inside the orifice of the upper ratchet head is attached a first tongue having a free end, with the free end of the first tongue disposed upwardly to slip by teeth of the flexible gear rack when the push button is pushed down but engage the teeth of the flexible gear rack when the upper washer and upper ratchet head experience pushing up from the spring so as to permit the upper washer and upper ratchet head to move the flexible gear rack and hence the piston upward; and the spring is in contact with a lower surface of the upper washer, and is driven downward into compression when the push button is pushed down such that compression of the spring results because its lower end is in contact with an upper surface of a lower washer, which resists the downward force of the pushing by having a rim that rests on a shoulder in the hollow housing; and
attached to or part of the lower washer is a lower ratchet head, which has an orifice through which the flexible gear rack can pass in one side and out another; inside the orifice of the lower ratchet head is attached a second tongue, with the free end of the second tongue disposed upwardly to engage the teeth of the flexible gear rack so that the flexible gear rack does not move downward and the piston can be prevented from moving downward;
such that when compression of the spring is released, the spring extends upward, pushes the upper washer and upper ratchet head upward, and, owing to the grip on the flexible gear rack provided by the first tongue on a tooth of the flexible gear rack, and slippage of the flexible gear rack when it moves upward through the lower washer and lower ratchet head and past the second tongue, the flexible gear rack moves up with the force of the spring and draws the piston connected by the actuating connection upward.

18. The device of claim 17, wherein the flexible gear rack includes a flexible belt body, and weak spots are provided along the length of the flexible belt body so that a spent portion of the flexible belt body can fold up after the flexible belt body has been pulled to actuate the piston.

19. The device of claim 17, wherein the walled, hollow housing has a top wall, side walls, and a bottom wall having a vacuum-releasing opening therein; and the opening on the first end opens through the top wall.

20. The device of claim 18, wherein the walled, hollow housing has a top wall, side walls, and a bottom wall having a vacuum-releasing opening therein; and the opening on the first end opens through the top wall.

* * * * *